United States Patent [19]

Takahashi et al.

[11] Patent Number: 4,639,652
[45] Date of Patent: Jan. 27, 1987

[54] CONTROL SYSTEM FOR ROBOT MANIPULATOR

[75] Inventors: Tohru Takahashi, Yokosuka; Kunihiko Kurami, Kawasaki, both of Japan

[73] Assignee: Nissan Motor Co., Ltd., Japan

[21] Appl. No.: 746,021

[22] Filed: Jun. 18, 1985

[30] Foreign Application Priority Data

Jun. 19, 1984 [JP] Japan ................... 59-124472

[51] Int. Cl.⁴ .............................................. G05B 19/42
[52] U.S. Cl. .................................... 318/568; 318/317; 318/432
[58] Field of Search ............... 318/317, 632, 619, 618, 318/568 L, 568 M, 432, 433

[56] References Cited

U.S. PATENT DOCUMENTS

| 3,855,511 | 12/1974 | Smith | 318/317 |
|---|---|---|---|
| 4,051,423 | 9/1977 | Touchton et al. | 318/619 X |
| 4,152,632 | 5/1979 | Peterson | 318/317 |
| 4,284,942 | 8/1981 | Bigley | 318/619 X |

FOREIGN PATENT DOCUMENTS 58-169203 10/1983 Japan .

Primary Examiner—Benjamin Dobeck
Attorney, Agent, or Firm—Leydig, Voit & Mayer

[57] ABSTRACT

A control system for an multi-articulation robot manipulator in which an electric current used to drive the robot manipulator is detected and compared with a predetermined level band near the saturated current level of the electric current, and a feedback gain is adjusted such that the detected electric current reaches within the predetermined level band.

2 Claims, 7 Drawing Figures

CONTROL SYSTEM FOR ROBOT MANIPULATOR

BACKGROUND OF THE INVENTION

The present invention relates to a control system for a controlled body, such as a robot manipulator.

Laid-open Japanese patent application No. 58-169203 discloses a control system for a robot where the optimum feedback gain values are stored, each for position assumed by a robot and load applied to the robot. In this conventional control system, a feedback gain provided when the load is applied is different from a feedback gain provided when no load is applied to the robot even with the same position assumed by the robot.

If this conventional control system is implemented in a controller for a multi-articulation robot manipulator using an electric motor as an actuator for driving each of the articulations, since the feedback gain is selected from the initially set fixed stored values even if there occur variation in friction at each of the articulations which is caused by environment temperature/humidity and aging of the mechanical parts, a problem arises that the motor is controlled with the motor driving electric current saturated or with most of the motor power potential left unconsumed, failing to assure the complete stability in motion and failing to accomplish speed-up of the motion.

SUMMARY OF THE INVENTION

According to the present invention, there is provided a control system for a controlled body whose motion is controlled by a motor wherein the control characteristic of the controlled body is variable in response to a feedback gain. According to the control system, a value indicative of an electric current used for driving the motor is detected and compared with a predetermined level band based on the saturated level of the electric current, and the feedback gain is adjusted so that the detected value reaches within the predetermined level band.

An object of the present invention is to provide a control system which assures stable and high speed motion of a controlled body.

BRIEF DESCRIPTION OF THE DRAWINGS

FIG. 2b is a timing diagram showing a pattern in which an articulation angle is to vary in response to the change shown in FIG. 2a;

FIG. 2c is a timing diagram showing a pattern in which the ariculation angular velocity is to vary in response to the change shown in FIG. 2a;

DESCRIPTION OF THE EMBODIMENT

Figure 1:
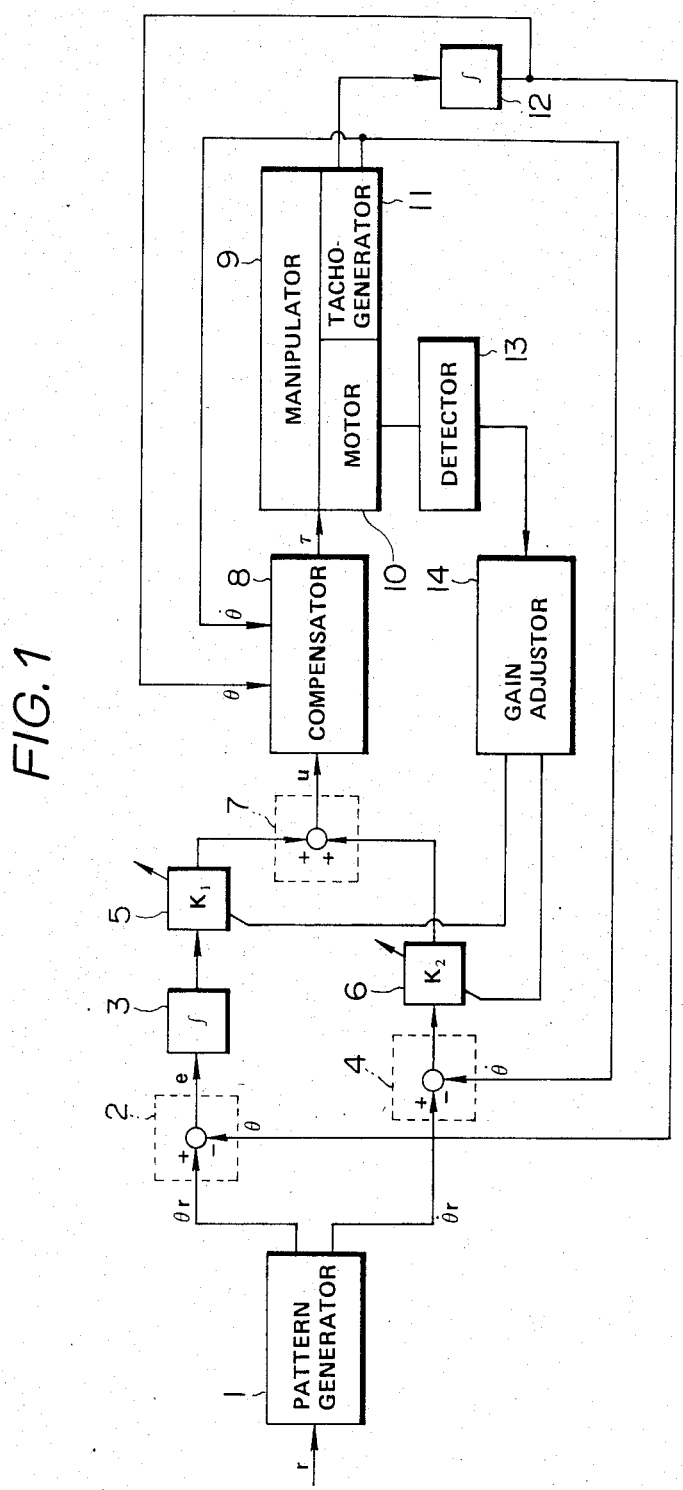
FIG. 1 is a block diagram showing a control system for a manipulator of a robot according to the present invention.

Referring to FIG. 1, one embodiment of a control system for an articulated manipulator of a robot according to the present invention is shown in a block diagram.

Reference numeral 1 designates a desired pattern generator which, when a manipulator 9 is to change from an initial state to a final state, generates an articulation angle $\theta r$ and an articulation angular velocity $\dot{\theta}r$ which vary with time t in a predetermined desired pattern immediately after the occurrence of a change in an input representative of the state to be assumed by the manipulator 9. The input r, $\theta r$ and $\dot{\theta}r$ are matrices.

Reference numeral 2 designates a summation point where a difference is given between the desired ariculation angle $\theta r$ generated by the desired pattern generator 1 and an actual articulation angle $\theta$ which is an output of an integrator 12 where an output of a tachogenerator 11 attached to the manipulator 9 is integrated. This difference is referred to as a positional error e. The positional error e is applied as an input to an integrator 3 for integration.

The output of the integrator 3 is multiplied with a feedback gain $K_1$ at a gain providing block 5. The output of the gain providing block 5 is applied to a summation point 7.

Reference numeral 4 is a summation point where there is given a difference between the desired articulation angular velocity $\dot{\theta}r$ and an actual articulation angular velocity $\dot{\theta}$ which is an output of the tachogenerator 11. This difference is multiplied with a feedback gain $K_2$ at a gain providing block 6. The output of the gain providing block 6 is applied to the summation point 7.

At the summation point 7, the outputs of the both of the gain providing blocks 5 and 6 are added and the output thereof indicative of the summation is applied as an servo input u to a compensator 8.

The feedback gains $K_1$ and $K_2$ are variable by a gain adjustor 14 where the feedback gains $K_1$ and $K_2$ are increased or decreased in response to comparison result of a motor electric current used to drive each of the articulations of the manipulator 9 such that the maximum level of the motor electric current falls in a predetermined band defined between the saturated electric current level $I_{max}$ of the motor and $I_{MU}$. The band has predetermined maximum and minimum levels $I_{max}$ and $I_{MU}$.

Reference numeral 10 designates a motor serving as an actuator for each of the articulations of the manipulator 9. Reference numeral 13 designates a detector which detects the intensity of electric current passing though each motor 10.

The compensator 8 receives inputs u, $\theta$, $\dot{\theta}$ and performs arithmetic operation which will be discussed hereinafter to output a torque command $\tau$. This torque command $\tau$ is applied as a compensator control input to the manipulator 9.

The system including the multi-articulation manipulator 9 can be expressed by the following equation:

$$J(\theta)\ddot{\theta} + f(\theta, \dot{\theta}) + V(\theta)\dot{\theta} + g(\theta) = \tau \quad (1)$$

where
$\theta = [\theta_1, \ldots \theta_n]^t$ ($\theta_i$, i=1 ... n: the articulation angle of each articulation, n: the number of articulations)
$\tau = [\tau_1, \ldots \tau_n]^t$ ($\tau_i$, i=1 ... n: the driving torque applied to each articulation)
$J(\theta)$: the inertial moment matrix
$f(\theta, \dot{\theta})$: the term of Coliolis, centrifugal force
$V(\theta)$: the term of the viscous friction of each joint
$g(\theta)$: the term of the gravity.

As will be readily understood from the equation (1), this system is a coupled non-linear dynamic system which requires elimination of non-linear property and coupling property among the articulations in order to realize feedback control so as to provide high speed high precision motion control of the manipulator 9.

If the driving torque $\tau$ is expressed by equation (2), the system becomes generally linear as expressed by equation (3), so that the feedback control turns out to be more effective.

$$\tau = J(\theta)[F_1\dot{\theta} + F_2\dot{\theta} + Gu] + f(\theta, \dot{\theta}) + V(\theta)\dot{\theta} + g(\theta) \quad (2)$$

$$\ddot{\theta} = F_2\dot{\theta} + F_1\theta + Gu \quad (3)$$

where, $F_1$, $F_2$, G are constant matrices (more particularly, $F_1$ and $F_2$ are diagonal matrices for decoupling) and u is the servo input (see FIG. 1).

The compensator 8 has stored therein various data regarding the manipulator 9, viz., the position of center of gravity of each link expressed in terms of a coordinate system fixed to each articulation, the weight of each link, the inertial moment, the coordinate system coefficient, the commutator matrix between the link's coordinate systems, the gains $F_1$, $F_2$, and G. Inputs to the compensator 8 are articulation angle $\theta$, ariculation angular velocity $\dot{\theta}$, and servo input u. Based on these inputs, the compensator 8 calculates the equation (2) by using Luh's algorithm, viz., an algorithm which allows high speed calculation of an equation of the type shown in the equation (1). The result of the calculation of the equation (2) is output as the torque command $\tau$ and applied to the motor 10.

With the compensator 8, the system becomes generally linear and the axes of the articulations are now allowed to be considered as being independent from each other. This allows independent servo control of each of the axes. Thus, the following description relates with the operation with regard to one axis only.

Figure 2A:
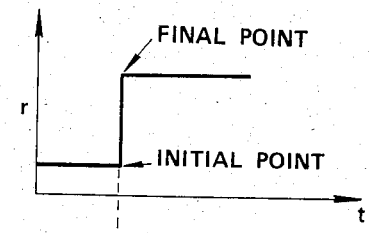
FIG. 2a is a timing diagram showing a change in an input signal, viz., position indicative signal.
Figure 2B:
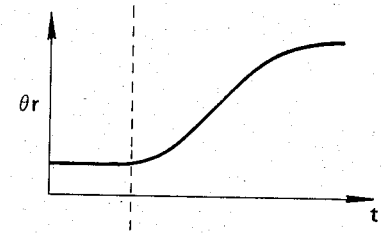
Figure 2C:
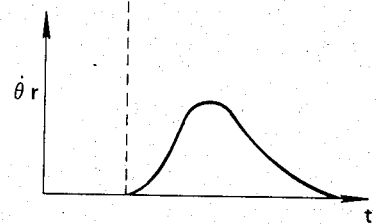
Figure 3:
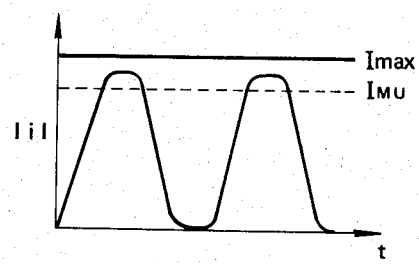
FIG. 3 is a timing diagram showing cycle-by-cycle variation in electric motor current.

The desired pattern generator 1 generates a desired articulation angle $\theta r$ and a desired articulation angular velocity $\dot{\theta}r$ in response to a change in articulation state r as shown in FIG. 2a. The desired articulation angle $\theta r$ and angular velocity $\dot{\theta}r$ vary against time t as shown in FIGS. 2b and 2c, respectively. The servo control system performs control in such a manner as to follow up the variation of these variables.

The generator patterns of the articulation angle $\theta r$ and angular velocity $\dot{\theta}r$ may be determined at the discretion of a designer. For example, they can be given in the form of a transfer function as follows:

$$\frac{\theta r(s)}{r(s)} = \frac{b_1}{s^2 + a_1 s + a_2} \quad (4)$$

(s = the Laplace transfer variable)

It is possible to determine the servo control system such that its criterion function becomes minimum. The criterion function is expressed by the following equation:

$$J = \int_0^\infty (e^2 + \lambda u^2) dt \quad (5)$$

($e$ = the positional error, $\lambda$ = the adjustment parameter)

Finding u which minimize the criterion function (the process of finding the solution is taught by the book entitled "LINEAR SYSTEM CONTROL THEORY" by Katsuhisa YOSHIDA, issued by SHOKO DO), $$\dot{u} = K_1 e + K_2 \begin{bmatrix} \dot{\theta} \\ \theta \end{bmatrix} + K_3 \begin{bmatrix} \dot{\theta}r \\ \theta r \end{bmatrix} \quad (6)$$

The above equation is integrated to give $$u = K_1 \int_0^t e\, dt + K_2 \begin{bmatrix} \dot{\theta} \\ \theta \end{bmatrix} + K_3 \begin{bmatrix} \dot{\theta}r \\ \theta r \end{bmatrix} . \quad (7)$$

Since $K_2$ satisfies a well known relation with $K_3$, viz., $K_2 = -K_3$, $$u = K_1 \int_0^t e\, dt + K_2 \begin{bmatrix} \dot{\theta} - \dot{\theta}r \\ \theta - \theta r \end{bmatrix} . \quad (8)$$

Therefore, the servo control system may be constructed as shown in FIG. 1.

The feedback gains $K_1$ and $K_2$ given at the gain multipliers 5 and 6 may be chosen such that the criterion function as expressed by the equation (5) is minimized, and the adjustment parameter $\lambda$ may be determined at the discretion of the designer taking into account the capacity of the motor 10 such that the motor electric current passing through the motor 10 will not be saturated.

Although the detailed solution to equation 8 is omitted, the feedback gains which minimizes the equation (5) are given by:

$$K_1 = C_1/(A_1 + \lambda),$$

$$K_2 = C_2/(A_2 + \lambda) \quad (9).$$

where $A_1$, $A_2$, $C_1$ and $C_2$ are constants determined from $F_1$, $F_2$, G of the equation (3) and $a_1$, $a_2$, and $b_1$ of the equation (4).

As will be understood from the above equation (9), an increase in $\lambda$ causes a decrease in each of the gains $K_1, K_2$. When the gains are decreased, the electric current used to drive the motor 10 drops. When the gains are increased, the electric current used to drive the motor 10 rises.

Figure 4:
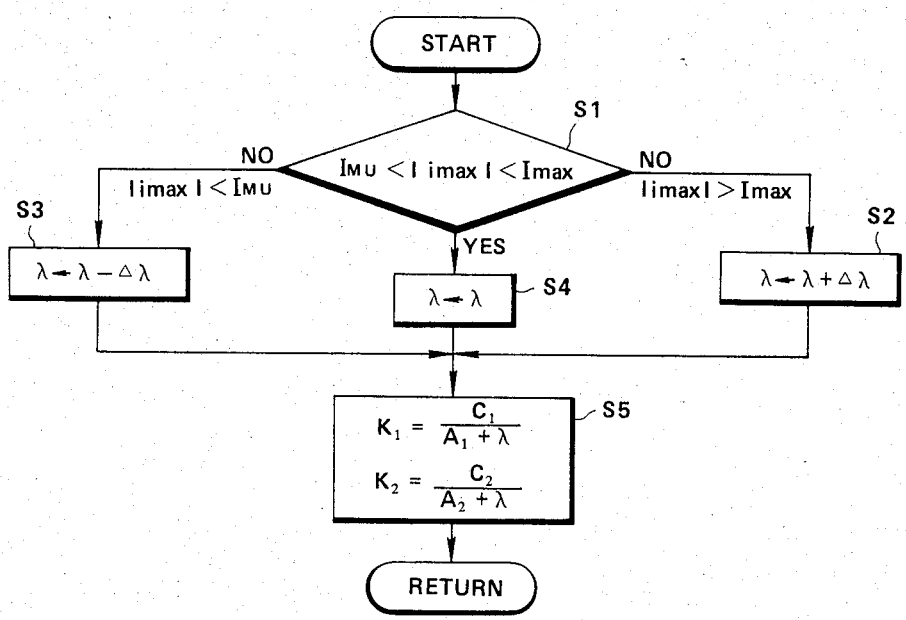
FIG. 4 is a flowchart.

In the gain adjuster 14, the electric current i passing through the motor 10 as detected by the electric current detector 13 is monitored and compared with a predetermined level band that is set based on the saturated electric current level $I_{max}$ (viz., a level band defined between $I_{max}$ and $I_{MU}$) and a decision is made to determine whether or not the electric current was during one cycle of operation performed (viz., whether or not the maximum value $|i_{max}|$ of the motor electric current has deviated from the level band (see step S1 shown in FIG. 4). If the electric current is saturated, the value $\lambda$ set during the preceding cycle is increased by a predetermined small value $\Delta\lambda$ (see step S2), and thus the feedback gains $K_1$ and $K_2$ are decreased (see step S5), thereby to prevent the electric current from being saturated during the operation in the next cycle. If the motor electric current stays below the level band, the value $\lambda$ is decreased by the predetermined small value $\Delta\lambda$ (see step S3) and thus the feedback gains $K_1$ and $K_2$ are increased (see step S5), thereby to cause the maximum value $|i_{max}|$ of the motor electric current to reach the level band. If the maximum value $|i_{max}|$ stays in the level band, the value λ is unmodified (step S4), and thus the feedback gains $K_1$ and $K_2$ are unmodified either (see step S5).

The execution of the flow of jobs as shown in FIG. 4 is repeated after completion of each operation so that the maximum value $|i_{max}|$ of the motor electric current used in each operation is so adjusted that it always stays near the saturated level.

The above control system may be implemented by a discrete circuit or by a microcomputer-based system.

Figure 5:
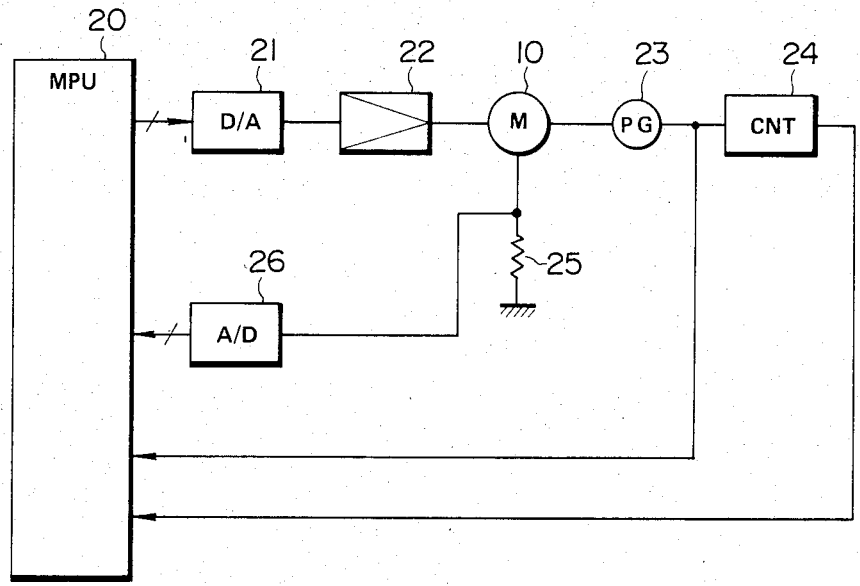
FIG. 5 is a computer based control system for a manipulator of a robot according to the present invention.

Referring to FIG. 5, the microcomputer based control system is shown. Reference numeral 20 designates a microcomputer processor unit MPU whose power source and oscillator circuit have been omitted. Reference numeral 21 designates a D/A converter, reference numeral 22 designates an electric current amplifier. Via the converter 21 and the amplifier 22, a DC motor 10 is driven. Reference numeral 23 designates a pulse generator with which the articulation angular velocity is detected. Reference numeral 24 designates a counter with which the articulation angle is detected. Reference numeral 25 designates an electric current detecting resistor and reference numeral 26 an A/D converter. With the resistor 25 and A/D converter 26, the electric current passing through the motor 10 is detected. The microcomputer 20 performs all of the functions described hereinbelow.

It will now be understood that with the above discussed control system, the variation in control performance which is caused by the variation in friction at each of the articulations of the manipulator, by the aging of the mechanical parts and by the variation in motion of the motor is suppressed, and thus the maximum performance of the motor power is fully used. Thus, stable and high speed motion of the manipulator have been assured.

What is claimed is:

1. A control system for a controlled body whose motion is controlled by the output of an electric motor comprising:
   a source providing electric current for the motor;
   a feedback loop providing feedback signals from the output of the motor to the source including means for adjusting gain in the feedback signals;
   means for detecting a value representing electric current supplied from said source for driving the motor;
   means for comparing the detected value with a predetermined band having maximum and minimum levels based on the saturated electric current level of the motor; and
   means responsive to the comparison for adjusting the feedback gain so that the detected value is maintained within said predetermined band to control the characteristic motion of the controlled body.

2. A control method for a controlled body whose motion is controlled by the output of an electric motor comprising:
   supplying electric current for driving the motor;
   providing feedback signals from the output of the motor to the supply through a feedback loop having means for adjusting gain in the feedback signals;
   detecting a value representing electric current supplied for driving the motor;
   comparing the detected value with a predetermined band having maximum and minimum levels based on the saturated electric current level of the motor; and
   adjusting the feedback gain responsive to the comparison so that the detected value is maintained within said predetermined band to control the characteristic motion of the controlled body.

* * * * *